United States Patent [19]

Heggertveit

[11] Patent Number: 5,456,838
[45] Date of Patent: Oct. 10, 1995

[54] SEPARATOR FOR AT LEAST TWO SUBSTANCES HAVING DIFFERENT DENSITIES, AT LEAST ONE OF WHICH IS A LIQUID

[76] Inventor: Fredrik Heggertveit, N-6400, Molde, Norway

[21] Appl. No.: 129,209

[22] PCT Filed: Apr. 8, 1992

[86] PCT No.: PCT/NO92/00065

§ 371 Date: Oct. 8, 1993

§ 102(e) Date: Oct. 8, 1993

[87] PCT Pub. No.: WO92/18216

PCT Pub. Date: Oct. 26, 1992

[30] Foreign Application Priority Data

Apr. 11, 1992 [NO] Norway ................................. 911425

[51] Int. Cl.$^6$ ................................. B01D 21/26
[52] U.S. Cl. ................................. 210/512.3; 210/512.1; 210/787; 210/521; 210/523
[58] Field of Search ................................. 210/512.1, 512.3, 210/787, 521, 523

[56] References Cited

U.S. PATENT DOCUMENTS

| | | |
|---|---|---|
| 1,709,971 | 4/1929 | Coe . |
| 3,849,310 | 11/1974 | Condolios et al. ................ 210/512.1 |
| 3,849,311 | 11/1974 | Jakubek ................................. 210/521 |
| 3,915,858 | 10/1975 | Condolios ............................. 210/521 |

FOREIGN PATENT DOCUMENTS

| | | |
|---|---|---|
| 2507190 | 9/1976 | Germany . |
| 2453555 | 2/1983 | Germany . |
| 116439 | 5/1946 | Sweden . |

OTHER PUBLICATIONS

PTO 95–465, English Translation of Germany, OLS No. 25 07 190 Edvarson, Mar. 1946.
US PTO 95–602 English Translation of SE 116439 Grantz et al., Sep. 1976.

*Primary Examiner*—Robert A. Dawson
*Assistant Examiner*—David Reifsnyder
*Attorney, Agent, or Firm*—Browdy and Neimark

[57] ABSTRACT

A liquid separator for separation of a mixture of at least two substances having different densities, at least one of which substance is a liquid, comprising a preferably cylindrical housing (7) having a tangential inlet (2) at the upper end and an outlet (12) at the lower end thereof, that there are centrally disposed within the housing a plurality of vertically spaced plate members (3) having the form of a truncated cone with the open vertex oriented upward, and that the vertex (4) of the uppermost plate member is connected to a transport line (5). The housing (7) has between the inlet (2) and outlet (12) thereof at least one annular expanded area (9) provided with one or more current generators (13).

4 Claims, 2 Drawing Sheets

A-A

B-B

C-C

SEPARATOR FOR AT LEAST TWO SUBSTANCES HAVING DIFFERENT DENSITIES, AT LEAST ONE OF WHICH IS A LIQUID

The present invention relates to a liquid separator and particularly a separator for separating a liquid having low density from water. It is not limited to liquids only, as it will also separate out substances and particles that have low density in relation to water.

In connection with increased oil extraction offshore, and increasing transport of oil by ship, there is a steadily growing risk of oil spills into the water. To collect up oil from water, the oil must first be concentrated and confined, and this is normally done with the aid of oil booms. Then, known equipment such as skimmers, mops, etc., is used to transport oil mixed with water from this enclosure to the collection site. The mixture may then be subjected to further separation as required, in accordance with several known methods. There exist a number of separator systems with a high degree of efficiency for oil/water of both high and low concentrations. Several of the systems, which are sensitive with regard to solid matter, are based on high technology, are costly, and are poorly suited for the first phase of separation of oil from water in major oil spills. The present invention is based on new principles, is robust and is not particularly vulnerable to solid matter. It would be capable of separating oil from water in both large and small concentrations, and is therefore not dependent on oil booms for concentrating the oil prior to collection. The separator may placed conveniently in ships which draw in large amounts of water mixed with oil without major preparation as with use of booms, skimmers, etc.

The purpose of the present invention is to provide a separator having excellent separation properties for two or more substances of different densities, at least one of which is a liquid, where the concentration of one of the liquids is very small, for example, in cases of major oil spills at sea.

This is achieved with a separation assembly according to the invention consisting of a preferably cylindrical housing having a tangential inlet at the upper end and an outlet at the lower end thereof, where there are centrally disposed within the housing a plurality of vertically spaced plate members in the form of a truncated cone with the open vertex oriented upward; the uppermost plate member being connected to a transport line for the liquid having lowest density. The invention is also characterized in that the housing is provided, between the inlet and the outlet thereof, with at least one annular expanded area provided with one or more current generators.

A preferred embodiment form of the invention will now be described in more detail with reference to the accompanying drawings.

Figure 1:
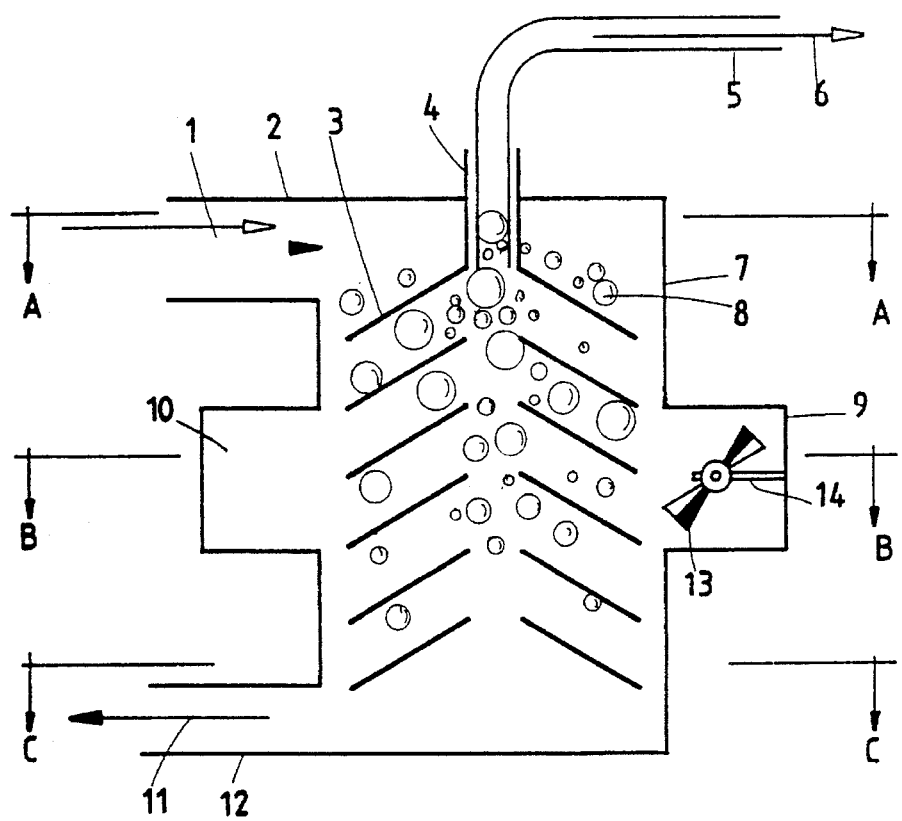
FIG. 1 shows a vertical section through a separator in accordance with the invention, seen from the side.
Figure 2:
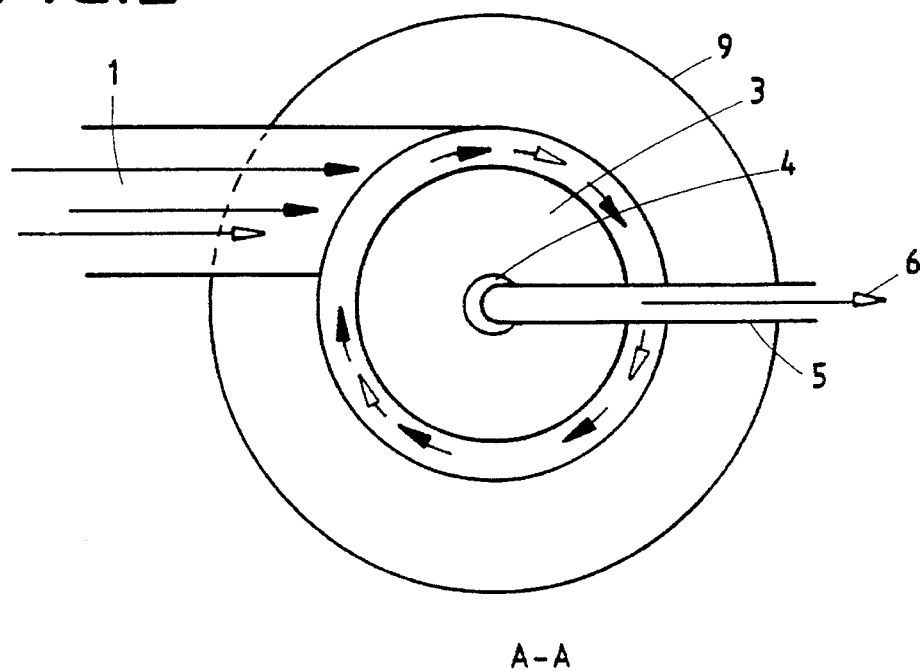
FIG. 2 shows a horizontal section through the separator along line A—A in FIG. 1.
Figure 3:
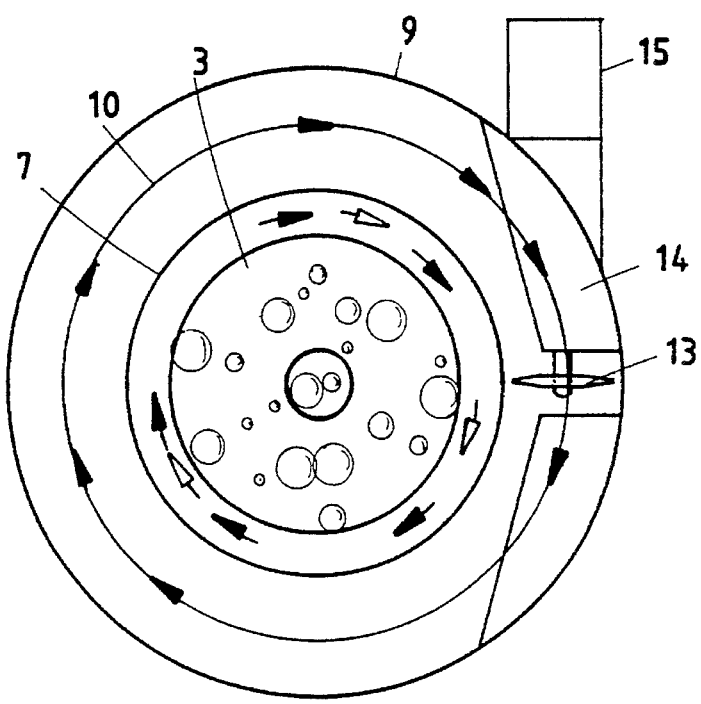
FIG. 3 shows a horizontal section through the separator along line B—B in FIG. 1.
Figure 4:
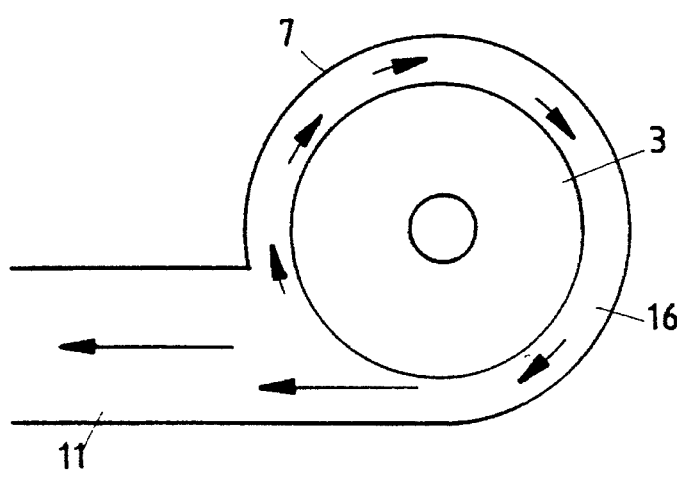
FIG. 4 shows a horizontal section through the separator along line C—C in FIG. 1.

FIG. 1 shows a section through the separator consisting of a top plate 2, a cylinder 7, which is encircled by a larger annular channel 9 and the bottom 12. In the center of the separator are mounted a plurality of truncated conical plates 3, which expediently are fastened to the main structure of the separator. The diameter of the conical plates 3 is somewhat smaller than the interior diameter of cylinder 7. Within the annular channel 9 is mounted a current generator 13 (shown here as a propeller), which is driven by motor 15. The channel 9 is additionally provided with suitable current stabilizers 14, according to need.

The mixture, preferably oil and water, enters tangentially at the top of the separator at inlet 1 so as to be set into rotation within the separator's cylinder 7. The mixture then flows down along the walls of cylinder 7. Due to the action of centrifugal force on the mixture as a consequence of the rotation, the liquid having lowest density (oil) will be drawn in toward the center of cylinder 7, while the liquid having greatest density (water) will be cast out toward the walls of cylinder 7. The velocity of the mixture will decline toward the center of the cylinder, so that when the oil particles are drawn inward and come under the edge of a cone 3, the rate of rotation will be further decreased due to the friction against the cone, at the same time as the oil particles will have a better opportunity to float upward. When an oil particle has entered the area beneath cone S, there are no forces to draw it outward again, and the oil is trapped. The oil particles float upward and collect underneath the uppermost cone 4 in the shape of an inverted tunnel, wherefrom the oil 6 is pumped out of the separator via transport line 5.

The separation takes place continuously, whilst the mixture sinks down through the separator toward the outlet 11. The current generator driven by motor 15 accelerates the mixture 10 when it arrives at channel 9. This substantially increases the separation effect. Acceleration channel 9 is an expedient feature for two reasons. It reduces the need to have a very high separator for treatment of a specific mixture in order to achieve satisfactory separation; it cuts down the required separation height by virtue of the increasing velocity.

Motor 15 may have a varying speed, thereby enabling the regulation of the acceleration of the mixture. This is an essential feature of the invention, as it makes possible the adaptation of the separation effect both in accordance with the amount of mixture introduced into the separator, and in situations where it is difficult to achieve a satisfactory separation.

Although the present invention is described with reference to a specific embodiment form, it is self-evident that a person skilled in the art may make changes and modifications without deviating from the scope of protection for the invention. Such modifications may entail, for example, substantially changing the length 3 of the cylinder, or utilizing more or fewer acceleration channels g. There may also be used other types of current generators than the one that is shown here.

I claim:

1. In a separator assembly for separating mixture of at least two substances having different densities, at least one of said substances being a liquid, said assembly comprising a housing (7) having an inlet (1) at an upper end thereof for said mixture, a first outlet (12) at a lower end thereof for one of said substances which has a higher density of said at least two substances, a second outlet (4) at said upper end for another of said substances which is lighter than said substance having a higher density, and separating means within said housing for assisting in the separation of said substances having different densities, said separating means comprising a plurality of plates, the improvement wherein:

said plates each comprising a truncated cone (7) with a top and a bottom, each said truncated cone having a large opening at its bottom and a small opening at its top, said truncated cones being vertically stacked in spaced relationship one above another along a height of said housing, each said truncated cone having a maximum diameter which is less than an internal diameter of said housing so as to define an annular space therebetween; said inlet (1) being disposed along a side of said housing so as to constitute means for feeding said mixture to said separator assembly so as to set said mixture into rotation within said housing so that said mixture flows downwardly along said housing within said annular space, wherein said housing (7) is provided with at least one annular expanded area (9) located along the height thereof between said inlet (1) and said first outlet (11), said annular expanded area (9) being provided with at least one current generator (13).

2. In a separator assembly for separating a mixture of at least two substances having different densities, at least one of said substances being a liquid, said assembly comprising a housing (7) having an inlet (1) at an upper end thereof for said mixture, a first outlet (12) at a lower end thereof for one of said substances which has a higher density of said at least two substances, a second outlet (4) at said upper end for another of said substances which is lighter than said substance having a higher density, and separating means within said housing for assisting in the separation of said substances having different densities, said separating means comprising a plurality of plates, the improvement wherein:

said plates each comprising a truncated cone (3) with a top and a bottom, each said truncated cone having a large Opening at its bottom and a small opening at its top, said truncated cones being vertically stacked in spaced relationship one above another along a height of said housing, each said truncated cone having a maximum diameter which is less than an internal diameter of said housing so as to define an annular space therebetween: said inlet (1) being disposed along a side of said housing so as to constitute means for feeding said mixture to said separator assembly so as to set said mixture into rotation within skid housing so that said mixture flows downwardly along said housing within said annular space, wherein said housing (7) is a circular cylindrical housing and said inlet (1) is aligned tangential to said circular cylindrical housing (7).

wherein said circular cylindrical housing (7) is provided with an annular expanded area (9) located along the height thereof between said inlet (1) and said first outlet (11), said separator assembly further comprising at least one current generator (13) located within said annular expanded area (9).

3. A separator assembly according to claim 2 wherein said inlet (1) is disposed horizontally and said second outlet (4) is disposed vertically along a central axis of said housing (7), each said truncated cone (3) having its upper opening disposed along said central axis.

4. A separator assembly according to claim 3 wherein an uppermost truncated cone (3) is in the shape of an inverted funnel with said second outlet (4).

* * * * *